United States Patent

[11] 3,576,083

[72] Inventor Arnold Perrot
P. O. Box Martiwag 4, CH 2560 Nidau, Switzerland
[21] Appl. No. 850,458
[22] Filed Aug. 15, 1969
[45] Patented Apr. 27, 1971
[32] Priority Sept. 24, 1968
[33] Switzerland
[31] 14,268/68

[54] MOUNTING FOR RECEIVING OBJECTS TO BE FRAMED
3 Claims, 4 Drawing Figs.
[52] U.S. Cl. .................................................. 40/152
[51] Int. Cl. .................................................. G09f 1/12
[50] Field of Search ....................................... 40/152, 156, 158, 13, 10

[56] References Cited
UNITED STATES PATENTS
| | | | |
|---|---|---|---|
| 2,616,197 | 11/1952 | Osburn | 40/152 |
| 2,823,472 | 2/1958 | Waller et al. | 40/152 |
| 2,824,397 | 2/1958 | Poulin | 40/152 |
| 2,826,843 | 3/1958 | Fabry | 40/152 |
| 3,242,605 | 3/1966 | Kleinschmidt | 40/152 |
| 3,281,976 | 11/1966 | Riedel | 40/152 |

Primary Examiner—Robert W. Michell
Assistant Examiner—Wenceslao J. Contreras
Attorney—Edward T. Connors ABSTRACT: A collapsible two-part mounting for receiving flat objects such as, for instance, transparencies, comprising a first mounting part with hinge-pins and a second mounting part with hinge-bearing pans supporting said hinge-pins and being oblong in a direction across the hinge-axis of the hinge-pins to allow movement of said mounting parts relatively to each other in the mounting plane in their collapsed position, improvements on said bearing pans for facilitating the opening of the mounting and for guaranteeing exact parallel position of the objects to be framed in locked condition.

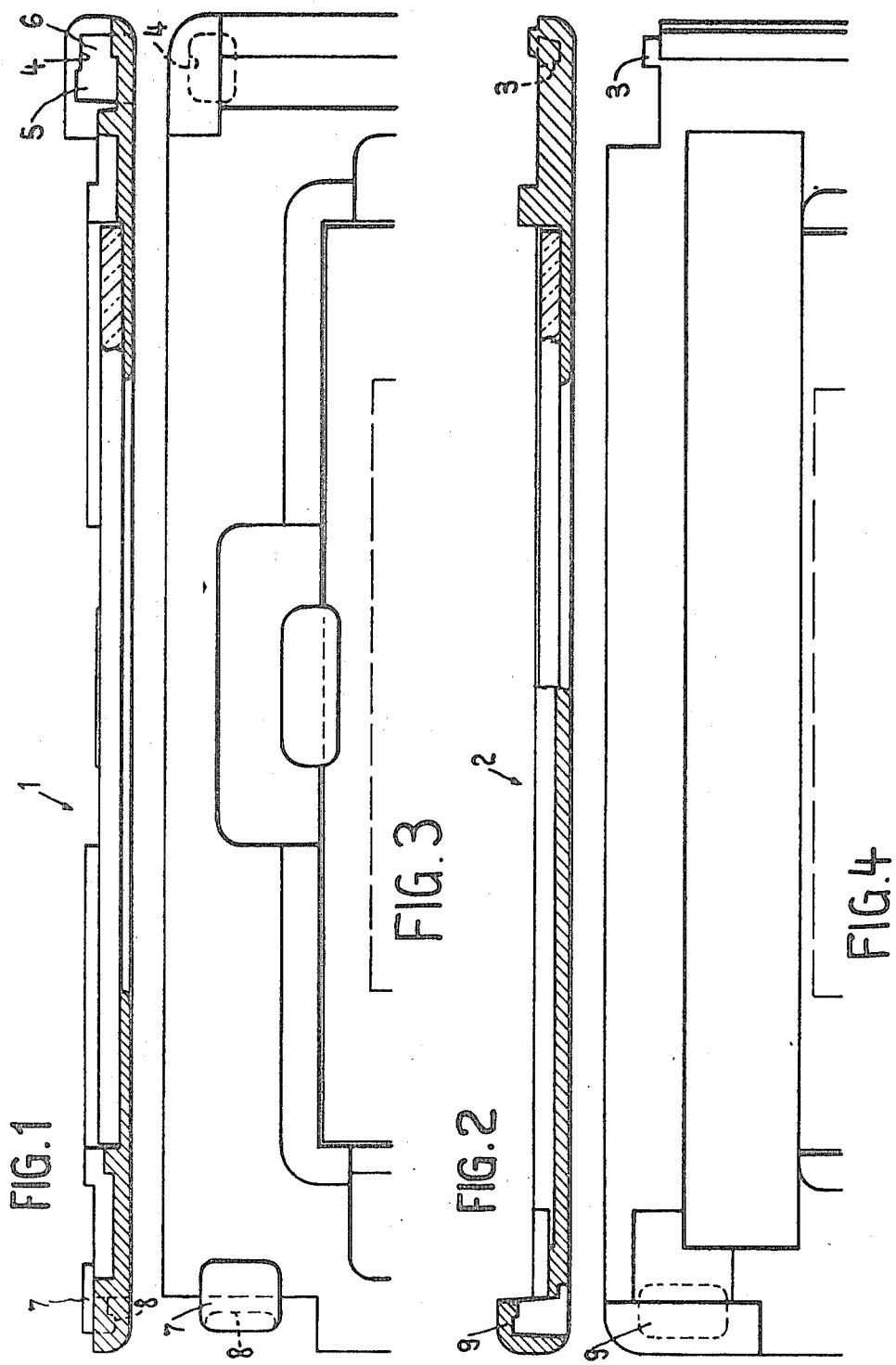

MOUNTING FOR RECEIVING OBJECTS TO BE FRAMED

Object of this invention is a mounting for receiving objects to be framed, such as, for instance, transparencies.

Another object of the invention is a collapsible two-part mounting for receiving objects to be framed, such as, for instance, transparencies, in which two mounting parts are hinged together.

In prior collapsible hinged two-part mountings shown and described in my U.S. Pat. No. 3,284,939 there is provided for a hinge connection between the two mounting parts, which allows a displacement of these parts relatively to each other in the mounting plane and across the hinge axis for the purpose of locking and unlocking the mounting parts in their collapsed position with and from each other, the hinge connection comprising hinge-bearing pans supporting hinge-pins, said pans being oblong in a direction across the hinge axis of said hinge-pins.

The present invention concerns a further development of my above-described mounting in that the hinge-bearing pans comprise, for facilitating the opening of the mounting, wide closing and opening portions and, for guaranteeing exact parallel position of the objects to be framed in locked position, a narrow locking portion closely engaging the hinge-pins.

Other objects and features ill be apparent from the following description of an example of performance of my invention, serving as a mounting for transparencies, reference being had to the accompanying drawings, in which:

FIG. 1 is a sectional view of the mounting part comprising the bearing pans,

FIG. 2 is a sectional view of the mounting part comprising the hinge-pins,

FIG. 3 is a plan view of a portion of the mounting part shown in FIG. 1,

FIG. 4 is a plan view of a portion of the mounting part shown in FIG. 2.

The mounting part 2 has in reach of two of its corners hinge-pins 3 of trapezoidal cross section. Each of these hinge-pins 3 engages a bearing pan 4 of the mounting part 1, having two portions 5 and 6. The portion 5 near the picture frame is larger in order to allow easy turning of the pin 3 in the bearing pan 4. The narrower portion 6 near the edge of the mounting has a dimension corresponding to the trapezoid height of the corresponding pin 3 for closely engaging the latter. Portion 6 serves the purpose of holding the pin 3 in determined position relatively to the other mounting part.

At the end away from the bearing side the mounting part 1 has near its corners lugs 7 with a bead 8 on one of the free ends of the lug. The other mounting part 2 has rests 9 to receive the beads 8.

Inserting the transparency with its cover glasses can take place in a well-known manner either by clamping it or by forcing it into one of the mounting parts.

After having inserted a transparency in one of the mounting parts, both mounting parts are collapsed together by 180°, whereby the hinge-pins 3 enter the wider portion 5 of the bearing pans 4. Afterwards, the mounting parts 1 and 2 are moved in their plane relatively to each other so that the beads 8 enter the rests 9 and the pivots 3 closely engage the narrower portions 6 of the pans 4.

This novel performance of my mounting guarantees a very precise adjustment and maintenance of the mounting parts relatively to each other, even after several repeated exchanges of transparencies. My novel mounting is also very resistant against wear and tear. This is important for cases where transparencies are frequently exchanged, such as, for instance, if already framed films are to be dismounted for making duplicates of them etc.

I claim:

1. In a collapsible hinged two-part mounting for receiving flat objects to be framed, a first mounting part comprising hinge-pins, a second mounting part comprising hinge-bearing pans supporting said hinge-pins, said hinge-bearing pans being oblong in a direction across the hinge-axis of said hinge-pins to allow movement of said mounting parts relatively to each other in the mounting plane in their collapsed position, the improvement of said hinge-bearing pans having a wider portion for facilitating the opening of the mounting, and a narrower portion to closely engage said hinge-pins for guaranteeing exact parallel position of the object to be framed in locked position.

2. A collapsible hinged two-part mounting according to claim 1, said hinge-pins having a trapezoidal cross section.

3. A collapsible hinged two-part mounting according to claim 1, one of said mounting-parts having, on the end away from the hinge-axis, lugs with beads, and the other mounting-part having, on the end away from the hinge-axis, rests to receive said beads.